United States Patent [19]
Fuchs et al.

[11] Patent Number: 5,377,543
[45] Date of Patent: Jan. 3, 1995

[54] LOW PROFILE ANGULAR RATE SENSOR ASSEMBLY

[75] Inventors: Charles R. Fuchs, Wayne; Peter Lindsay, Hardyston Township, Sussex County; Henry S. Nicholas, Paramus, all of N.J.

[73] Assignee: GEC-Marconi Electronic Systems Corp., Wayne, N.J.

[21] Appl. No.: 974,094

[22] Filed: Nov. 10, 1992

[51] Int. Cl.6 .............................................. G01P 9/02
[52] U.S. Cl. ........................................ 73/504; 73/510; 310/353; 74/5 F
[58] Field of Search ................... 73/504, 510, DIG. 4, 73/514; 74/5 F, 5.6 D; 310/329, 330, 353

[56] References Cited

U.S. PATENT DOCUMENTS

| | | | |
|---|---|---|---|
| 4,444,053 | 4/1984 | Rider | 73/504 |
| 4,621,529 | 11/1986 | Pittman | 73/504 |
| 4,700,973 | 10/1987 | Gademann et al. | 73/516 R |
| 4,715,227 | 12/1987 | Pittman | 73/504 |
| 4,872,342 | 10/1989 | Hanson et al. | 73/517 R |
| 5,156,056 | 10/1992 | Pittman et al. | 74/5 F |

Primary Examiner—Hezron E. Williams
Assistant Examiner—Helen C. Kowk
Attorney, Agent, or Firm—David L. Davis

[57] ABSTRACT

A low profile angular sensor assembly having a base member adapted for rotation about a spin axis and a generally planar gyroscopic element resiliently coupled to the base member for rotation therewith and for pivotal movement relative to the base member about a pivot axis orthogonal to the spin axis also includes a planar piezoelectric beam which is coupled to the base member and to the gyroscopic element so that it is substantially parallel to the gyroscopic element. The coupling is selectively compliant to isolate the piezoelectric beam from motion in the plane of the beam.

21 Claims, 4 Drawing Sheets

LOW PROFILE ANGULAR RATE SENSOR ASSEMBLY

BACKGROUND OF THE INVENTION

This invention relates to an angular rate sensor assembly for use in navigation equipment and, more particularly, to such a sensor assembly which has a low profile and improved mechanical stability. U.S. Pat. No. 4,621,529, the contents of which are hereby incorporated by reference, discloses an angular rate sensor assembly which includes a gyroscopic element having a spin axis, and a flexure hinge for resiliently mounting the gyroscopic element to a base. The sensor assembly further includes a torque sensing assembly which has a piezoelectric beam mounted in coaxial relation to the spin axis. A first beam restraining member mounts a first edge portion of the piezoelectric beam to the gyroscopic element and a second beam restraining member mounts an opposite edge portion of the piezoelectric beam to the base. The piezoelectric beam is adapted to generate an electrical signal proportional to the angular velocity of the sensor assembly about an axis perpendicular to the spin axis.

U.S. Pat. No. 4,715,227, the contents of which are hereby incorporated by reference, discloses an angular rate sensor assembly which is an improvement over the sensor assembly disclosed in the referenced U.S. Pat. No. 4,621,529. In the improved sensor assembly, the piezoelectric beam is generally diamond-shaped and is fixed to both the gyroscopic element and the base by means of wires oriented orthogonally both to the axis of the flexure hinge and to the spin axis.

While the assemblies disclosed in the referenced patents operate generally satisfactorily, certain improvements thereto have been found to be desirable. For example, in the previously disclosed assemblies, the piezoelectric beam is oriented colinear to the spin axis. A reduction in the axial length of the sensor assembly by positioning the piezoelectric beam in a plane perpendicular to the spin axis would reduce the overall axial length of the assembly. It is therefore an object of the present invention to provide an angular rate sensor assembly of the type disclosed in the referenced patents which has the piezoelectric beam supported in a plane perpendicular to the spin axis so that the axial length of the sensor assembly is reduced.

It is another object of this invention to provide an angular rate sensor assembly with improved mechanical stability.

It is a further object of the present invention to provide an angular rate sensor assembly of the type described wherein the gyroscopic element has increased inertial mass.

It is yet another object of the present invention to provide an angular rate sensor assembly of the type described wherein the coupling of the piezoelectric beam is selectively compliant to isolate the beam from motion in its plane. Such motion includes, for example, thermal stresses from expansion/contraction of dissimilar materials and inertial loads causing spurious stresses not proportional to the desired rate output.

SUMMARY OF THE INVENTION

The foregoing and additional objects are attained in accordance with the principles of this invention by providing an angular rate sensor assembly comprising a base member having a support surface and adapted for rotation about a spin axis transverse to the support surface, a generally planar gyroscopic element, and means for resiliently coupling the gyroscopic element to the base member support surface for rotation therewith and for pivotal movement relative to the base member about a single pivot axis orthogonal to the spin axis. The sensor assembly further comprises a planar piezoelectric beam, first coupling means for coupling the piezoelectric beam to the base member support surface and second coupling means for coupling the piezoelectric beam to the gyroscopic element. The first and second coupling means hold the piezoelectric beam substantially parallel to the gyroscopic element so that pivotal movement of the gyroscopic element relative to the base member about the pivot axis due to an angular velocity of the assembly about an axis orthogonal to the spin axis causes the piezoelectric beam to bend about a bend axis parallel to the pivot axis.

In accordance with an aspect of this invention, the gyroscopic element has a central opening and the first and second coupling means hold the piezoelectric beam within that opening.

In accordance with another aspect of this invention, the coupling means are selectively compliant to isolate the piezoelectric beam from motion in the plane of the beam.

In accordance with a further aspect of this invention, the gyroscopic element is formed with at least one cavity open along the outer periphery of the gyroscopic element and at least one weight is disposed in the cavity to increase the inertial mass of the gyroscopic element over what the inertial mass would be if the gyroscopic element did not have the cavity.

In accordance with yet another aspect of this invention, the first coupling means rigidly couples a first end of the piezoelectric beam to the base member support surface, and the second coupling means couples an opposed end of the piezoelectric beam to the gyroscopic element in a selectively compliant manner so that relative motion between the gyroscopic element and the piezoelectric beam in a direction parallel to the plane of the piezoelectric beam is absorbed by the second coupling means and motion of the gyroscopic element in a direction perpendicular to the plane of the piezoelectric beam is transmitted to the piezoelectric beam by the second coupling means.

In accordance with yet a further aspect of this invention, the first coupling means couples a first end of the piezoelectric beam to the base member support surface in a selectively compliant manner so that relative motion between the piezoelectric beam and the base member in a direction parallel to the plane of the piezoelectric beam is absorbed by the first coupling means and the piezoelectric beam is rigidly coupled to the base member to prevent such relative motion in a direction perpendicular to the plane of the piezoelectric beam, and the second coupling means couples an opposed end of the piezoelectric beam to the gyroscopic element in a selectively compliant manner so that relative motion between the gyroscopic element and the piezoelectric beam in a direction parallel to the plane of the piezoelectric beam is absorbed by the second coupling means and motion of the gyroscopic element in a direction perpendicular to the plane of the piezoelectric beam is transmitted to the piezoelectric beam by the second coupling means.

In accordance with still another aspect of this invention, the first coupling means couples a central section of the piezoelectric beam to the base member support surface in a selectively compliant manner so that relative motion between the piezoelectric beam and the base member in a direction parallel to the plane of the piezoelectric beam is absorbed by the first coupling means and the piezoelectric beam is rigidly coupled to the base member to prevent such relative motion in a direction perpendicular to the plane of the piezoelectric beam, and the second coupling means couples opposed ends of the piezoelectric beam to the gyroscopic element in a selectively compliant manner so that relative motion between the gyroscopic element and the piezoelectric beam in a direction parallel to the plane of the piezoelectric beam is absorbed by the second coupling means and motion of the gyroscopic element in a direction perpendicular to the plane of the piezoelectric beam is transmitted to the piezoelectric beam by the second coupling means.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
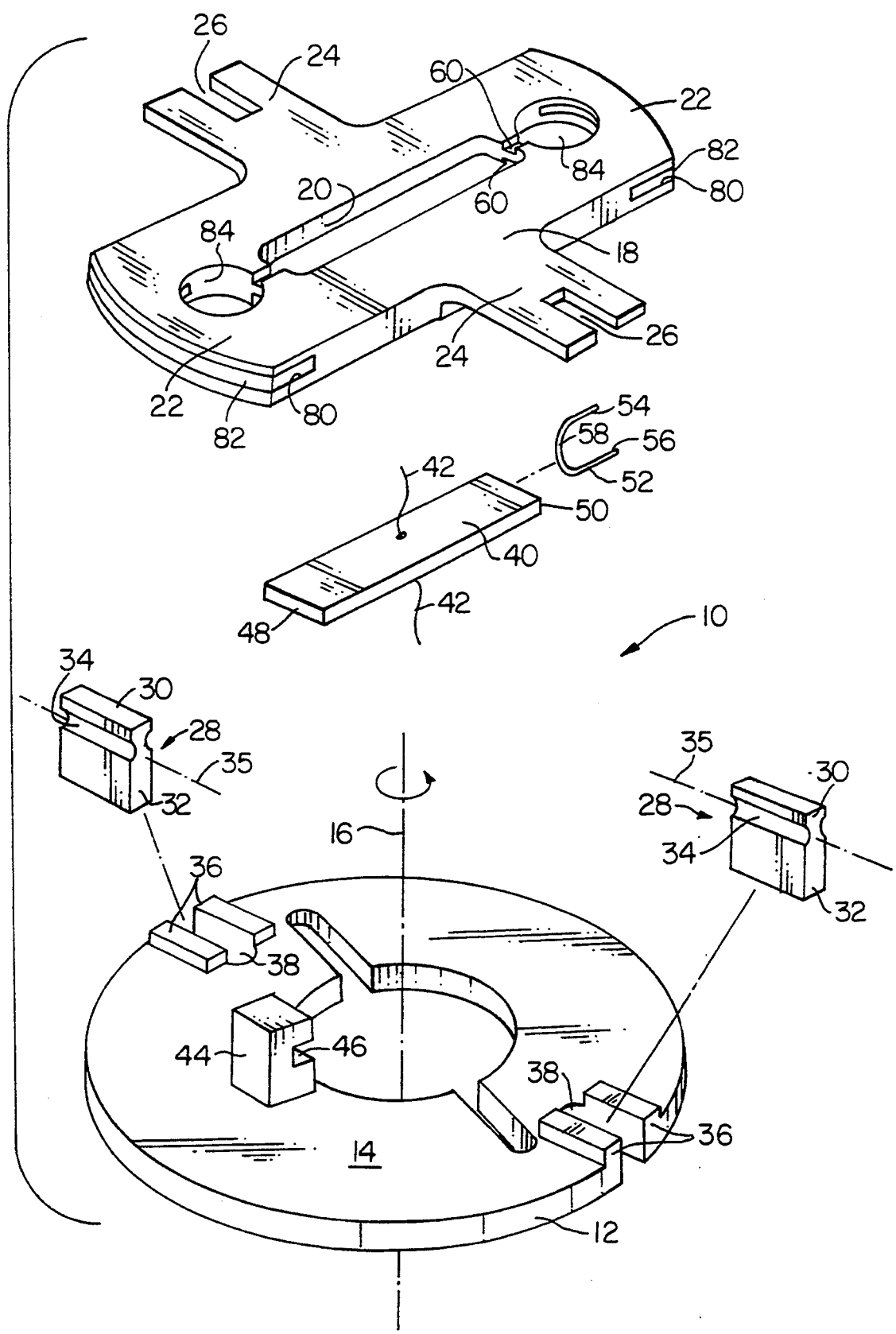
FIG. 1 is an exploded perspective view of a first embodiment of an angular rate sensor assembly constructed in accordance with the present invention.

FIG. 1 shows a first embodiment of an angular rate sensor assembly designated generally by the reference numeral 10 and constructed according to this invention. The assembly 10 includes a base member 12 having a support surface 14, which support surface is preferably generally planar. The base member 12 is coupled to a drive motor (not shown) for rotation about a spin axis 16 which is transverse to the support surface 14. When the support surface 14 is planar, the spin axis 16 is preferably orthogonal to the plane of the surface 14. The assembly 10 further includes a generally planar gyroscopic element 18. The gyroscopic element 18 is preferably formed with a generally rectangular shaped central opening 20 and a pair of opposed arms 22 which extend along the longitudinal axis of the opening 20. The gyroscopic element 18 is further formed with a second pair of opposed arms 24 which extend orthogonally to the arms 22. The arms 24 are bifurcated at their ends to form a pair of slots 26 for each receiving an upper end of a respective flexure hinge 28.

Each flexure hinge 28 includes upper and lower flange sections 30 and 32, respectively, separated by a web portion 34 of reduced thickness which defines the axis 35 of the hinge 28. The base member 12 is formed with diametrically opposed raised pairs of bosses 36, which are each separated to form diametrically opposed slots 38, in each of which is positioned the lower flange section 32 of a respective flexure hinge 28. As previously mentioned, the upper flange section 30 of each of the flexure hinges 28 is disposed within a respective one of the slots 26 of the gyroscopic element 18. Accordingly, the gyroscopic element 18 is resiliently coupled to the base member 12 for rotation therewith and for pivotal movement relative to the base member 12 about the flexure hinge axis 35, which extends along the web portions 34 and is orthogonal to the spin axis 16. Thus, the flexure hinge axis 35 defines the single pivot axis of the gyroscopic element 18.

The assembly 10 further includes a planar piezoelectric beam 40. Wires 42 are attached to the opposed major surfaces of the beam 40 to receive electrical signals generated within the beam 40 when the beam 40 is stressed and to transfer the signals to sensing circuitry (not shown), in a known manner, through slip rings or the like. The dimensions of the beam 40 and the central opening 20 of the gyroscopic element 18 are such that the beam 40 fits within the opening 20 with clearance when the beam 40 and the gyroscopic element 18 are coplanar.

As is known from the referenced patents, for sensing the angular rate of the assembly 10 about an axis orthogonal to the spin axis 16, the beam 40 must be coupled both to the base member 12 and to the gyroscopic element 18. According to this invention, such coupling holds the beam 40 substantially parallel to the gyroscopic element 18 so that when there is an angular velocity of the assembly 10 about some axis orthogonal to the spin axis 16, the resulting pivoting of the gyroscopic element 18 about the pivot axis 35 defined by the flexure hinges 28 causes the piezoelectric beam 40 to bend about a bend axis parallel to that pivot axis.

According to a first embodiment of this invention, the piezoelectric beam 40 has a first end rigidly coupled to the base member support surface 14 and an opposed end coupled to the gyroscopic element 18 in a selectively compliant manner so that relative motion between the gyroscopic element 18 and the piezoelectric beam 40 in a direction parallel to the plane of the beam 40 is absorbed, whereas motion of the gyroscopic element 18 in a direction perpendicular to the plane of the beam 40 is transmitted to the beam 40. For the rigid coupling of the beam 40 to the base member support surface 14, there is provided a boss 44 secured to the base member support surface 14 and extending toward the gyroscopic element 18. Preferably, the boss 44 extends into the opening 20 of the gyroscopic element 18. The boss 44 is formed with a slot 46 which is in a plane orthogonal to the spin axis 16. The width of the slot 46 in a direction parallel to the spin axis 16 is substantially equal to the thickness of the piezoelectric beam at its first end 48 so that the first end of the beam 40 may be retained within the slot 46. Preferably, the end 48 of the beam 40 is cemented into the slot 46.

To compliantly couple the opposed end 50 of the beam 40 to the gyroscopic element 18, there is provided a wire 52 having a first end 54, a second end 56, and a central section 58. The wire 52 is formed generally into a C-shape and the central section 58 is cemented to the end 50 of the beam 40. The ends 54, 56 of the wire 52 are cemented to the gyroscopic element 18 along the periphery of the opening 20. Preferably, the gyroscopic element 18 is formed with linear grooves 60 along its opposed major surfaces, with the grooves 60 extending from the periphery of the opening 20 orthogonally to both the spin axis 16 and the pivot axis 35 of the gyroscopic element 18. The ends 54, 56 of the wire 52 straddle the gyroscopic element 18 and are retained by cement in the grooves 60.

Figure 2A:
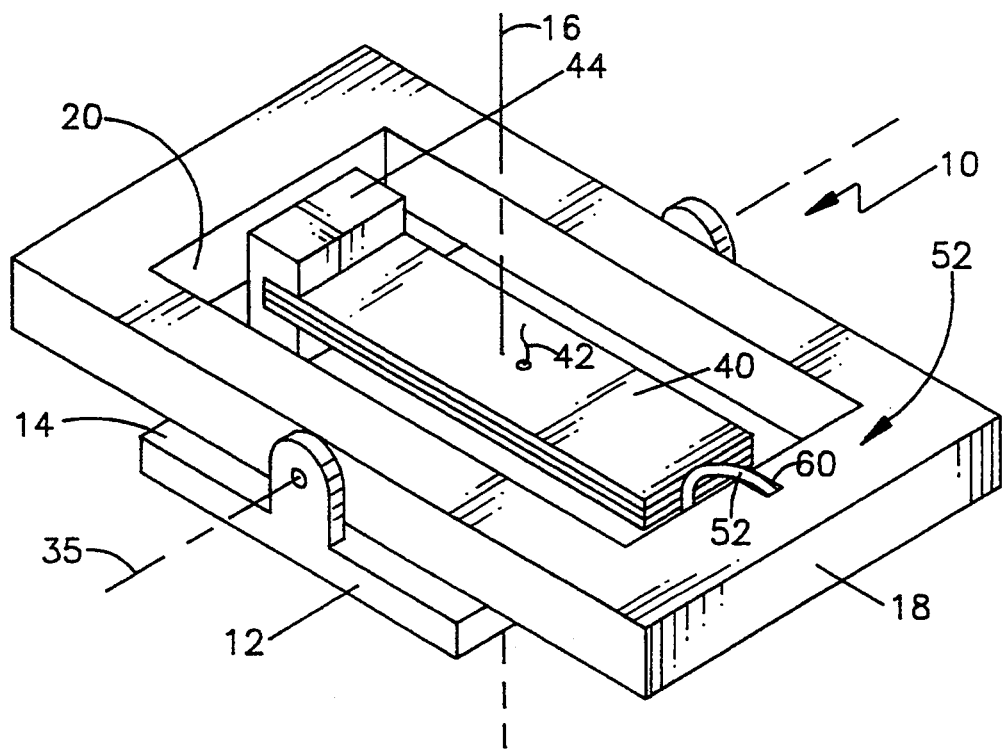
FIGS. 2A, 2B and 2C are a simplified perspective view, a simplified cross sectional view, and a simplified schematic diagram, respectively, of the first embodiment of this invention.
Figure 2B:
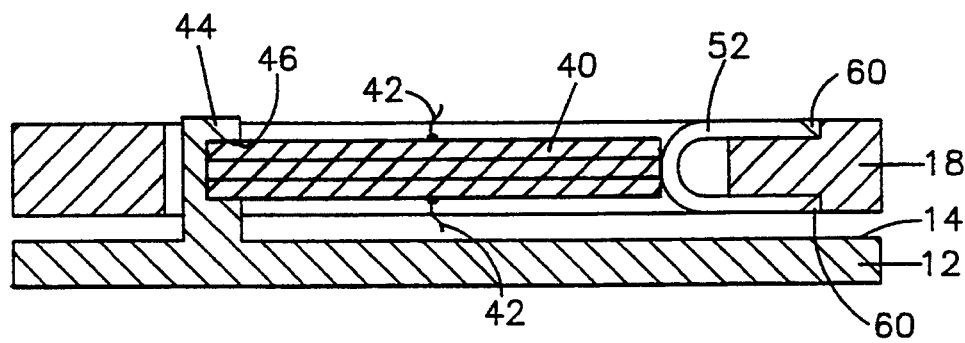
Figure 2C:
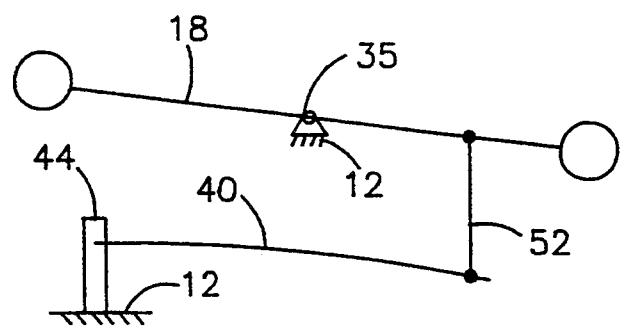

FIGS. 2A, 2B and 2C are schematic representations of the assembled sensor assembly 10 shown in FIG. 1. Specifically, FIG. 2C illustrates how pivoting of the gyroscopic element 18 about its pivot axis 35 relative to the base member 12 results in a simple bending of the piezoelectric beam 40 about a bend axis (not shown) which is parallel to the pivot axis 35. The coupling wire 52 is selectively compliant so that it absorbs relative motion between the gyroscopic element 18 and the piezoelectric beam 40 in a direction parallel to the plane of the beam 40, but transmits motion of the gyroscopic element 18 which is in a direction perpendicular to the plane of the piezoelectric beam 40.

Figure 3A:
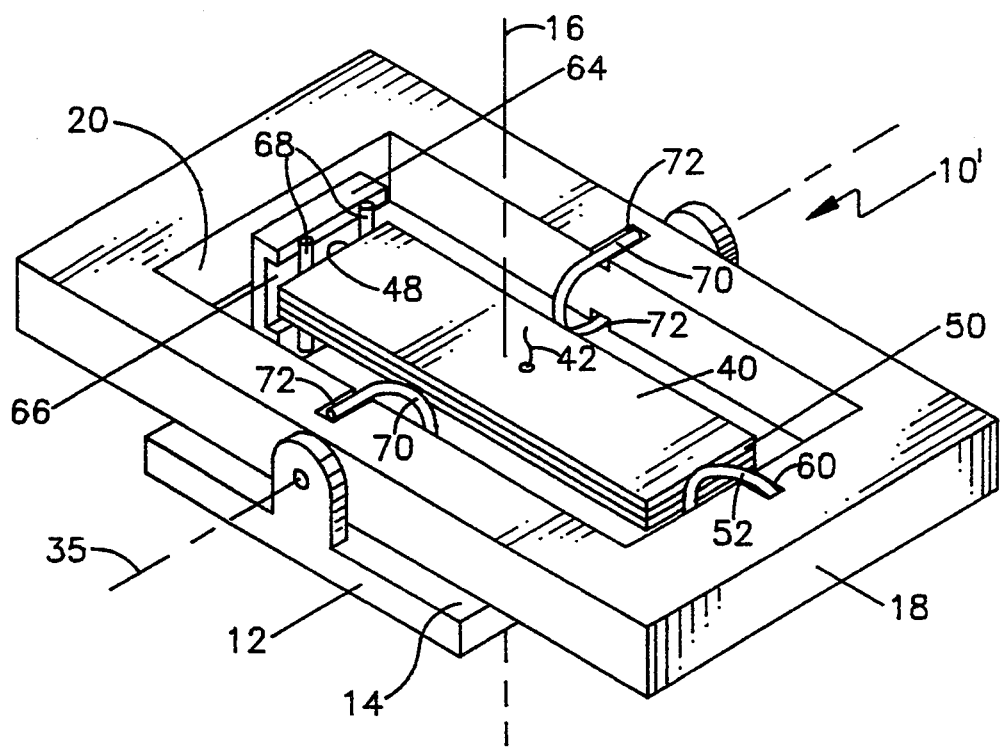
FIGS. 3A, 3B and 3C are a simplified perspective view, a simplified cross sectional view, and a simplified schematic diagram, respectively, of a second embodiment of this invention.
Figure 3B:
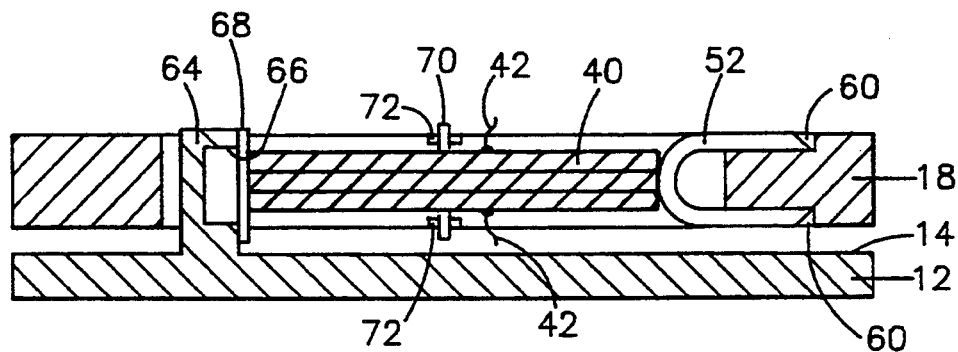
Figure 3C:
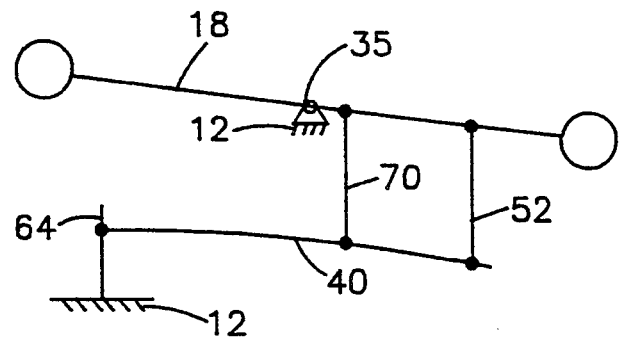

FIGS. 3A, 3B and 3C schematically depict a second embodiment of the sensor assembly, designated generally by the reference numeral 10'. In this embodiment, the coupling of the piezoelectric beam 40 to the base member support surface 14 is selectively compliant so that relative motion between the beam 40 and the base member 12 in a direction parallel to the plane of the beam 40 is absorbed, whereas the beam 40 is directionally rigidly coupled to the base member 12 to prevent such relative motion in a direction perpendicular to the plane of the beam 40. Thus, according to the second embodiment of the present invention, this coupling is effected by a boss 64 which is secured to the support surface 14 of the base member 12 and which extends into the opening 20 of the gyroscopic element 18. The boss 64 is formed with a slot 66 which lies in a plane orthogonal to the spin axis 16. The width of the slot 66 in a direction parallel to the spin axis 16 is greater than the thickness of the piezoelectric beam 40 at its first end 48. A pair of wires 68 extend across the slot 66 parallel to the spin axis 16, the wires 68 being cemented to the boss 64 at their ends and to the end 48 of the beam 40 at their central sections. The wires 68 therefore absorb relative motion between the beam 40 and the base member 12 in directions parallel to the plane of the beam 40, but provide a rigid coupling for such relative motion in a direction perpendicular to the plane of the beam 40.

For coupling the beam 40 to the gyroscopic element 18, the wire 52 is utilized, in the same manner as for the first embodiment. In addition, there is provided an additional pair of wires 70 which couple a central portion of the beam 40 to the gyroscopic element 18 in the same manner as the wire 52 couples the end 50 of the beam 40 to the gyroscopic element 18. The wires 70 are retained in grooves 72 formed in the opposed major surfaces of the gyroscopic element 18. The grooves 72 extend from the periphery of the central opening 20 along a line which is parallel to the pivot axis 35. FIG. 3C illustrates how pivoting of the gyroscopic element 18 about the pivot axis 35 relative to the base member 12 results in a more complex bending of the piezoelectric beam 40 than the simple bending of the first embodiment. This is because the wires 52, 70 limit the bending of approximately one half of the beam 40. In this second embodiment, it is necessary to couple the beam 40 to the gyroscopic element 18 at two points along its length in order to obtain the bending movement provided by the boss 44 in the first embodiment but which is not provided by the boss 64 in this second embodiment.

Figure 4A:
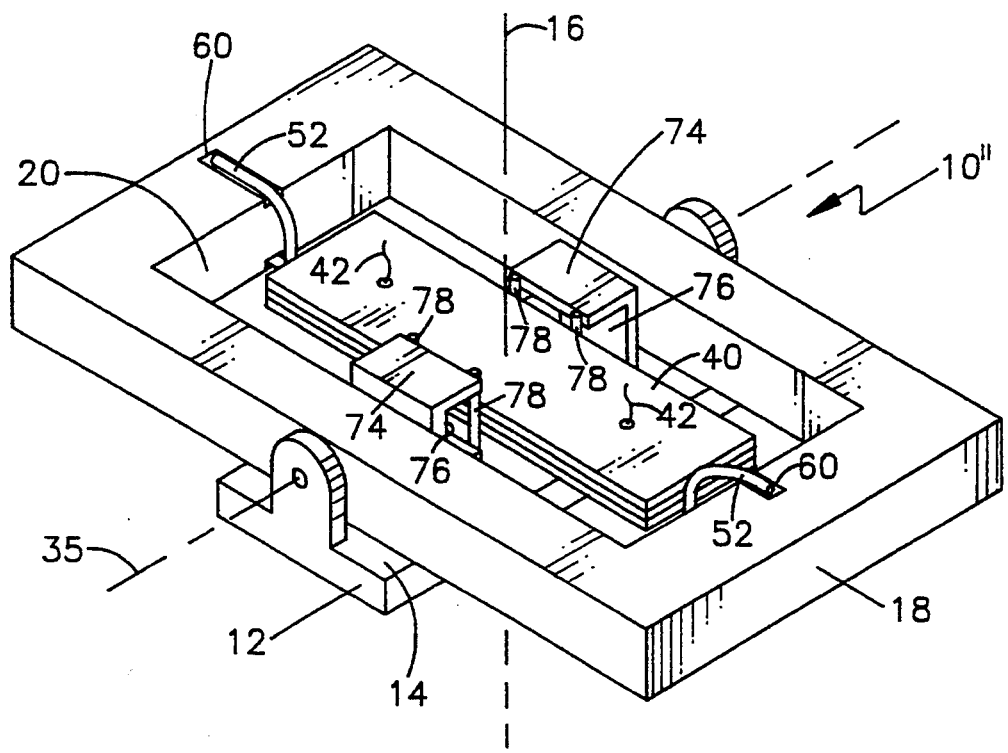
FIGS. 4A, 4B and 4C are a simplified perspective view, a simplified cross sectional view, and a simplified schematic diagram, respectively, of a third embodiment of this invention.
Figure 4B:
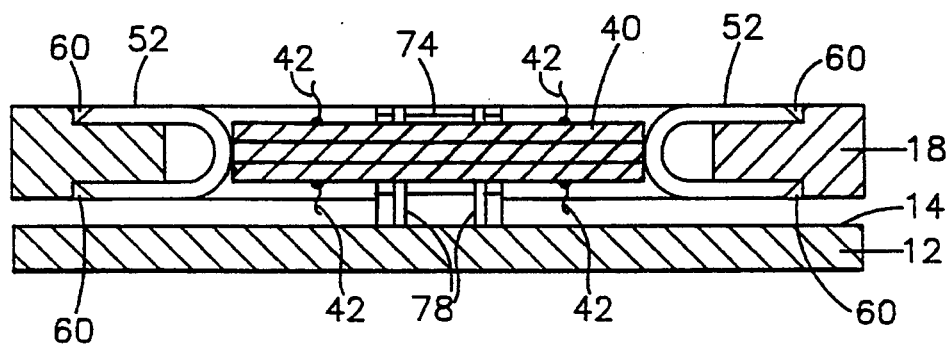
Figure 4C:
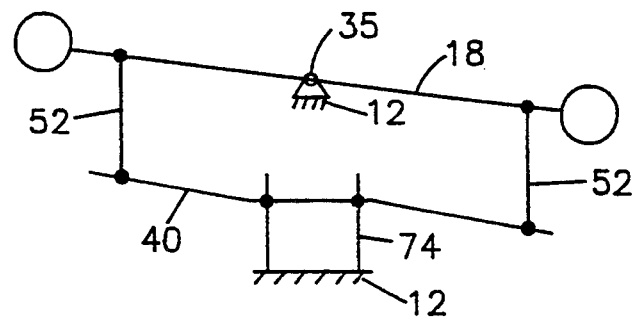

FIGS. 4A, 4B and 4C schematically depict a third embodiment of the sensor assembly, designated generally by the reference numeral 10''. In this embodiment, the coupling of the piezoelectric beam 40 to the base member support surface 14 is selectively compliant so that relative motion between the beam 40 and the base member 12 in a direction parallel to the plane of the beam 40 is absorbed, whereas the beam 40 is directionally rigidly coupled to the base member 12 to prevent such relative motion in a direction perpendicular to the plane of the beam 40. Thus, according to the third embodiment of the present invention, this coupling is effected at a central region of the beam 40 by a pair of bosses 74 which are secured to the support surface 14 of the base member 12 and which extend into the opening 20 of the gyroscopic element 18. Each of the bosses 74 is similar to the boss 64 of the second embodiment and includes a respective slot 76. The slots 76 are coplanar in a plane orthogonal to the spin axis 16 and face each other. The wires 78 span the slots 76 and are secured at their ends to the bosses 74 on opposite sides of the slots 76. The wires 78 are secured to the sides of the beam 40 at their central sections. The bosses 74 are positioned in opposed relationship across the beam 40 along a line parallel to the pivot axis 35. For coupling the piezoelectric beam 40 to the gyroscopic element 18, there are provided C-shaped wires 52 which have their ends retained in grooves 60 and their central sections secured to opposed ends of the piezoelectric beam 40. FIG. 4C illustrates how pivoting of the gyroscopic element 18 about its pivot axis 35 relative to the base member 12 results in a complex bending of the piezoelectric beam 40 in accordance with the third embodiment of this invention. Thus, the central section of the beam 40 does not bend, being held by the wires 78, whereas its opposite ends bend in two different directions.

In order to reduce thermal effects, the material of the base member 12, the gyroscopic element 18, the wires 52, 70 and 78, and the cement are chosen so that their coefficients of thermal expansion closely match that of the piezoelectric beam 40. For example, it has been found that using titanium for the base member 12 and the gyroscopic element 18, tungsten for the wires 52, 70 and 78, and epoxy for the cement, produces satisfactory results. Referring back to FIG. 1, in accordance with the principles of this invention, it is desired to maximize the inertial mass of the gyroscopic element 18. A consideration when selecting materials is that the coefficient of thermal expansion of the gyroscopic element 18 should be close to that of the piezoelectric beam 40, as discussed above. This limits the material of which the gyroscopic element 18 can be made to a material which is not particularly heavy. Therefore, according to this invention, the ends of the arms 22 of the gyroscopic element 18 are formed with cavities 80 into which are inserted inertial weights 82. This is preferably done prior to the final machining of the gyroscopic element 18. A satisfactory result has been achieved when the gyroscopic element 18 is formed of titanium and the inertial weights 82 are tungsten. The holes 84 in the gyroscopic element 18 are used for balancing the gyroscopic element 18. Accordingly, there has been disclosed an improved low profile angular rate sensor assembly. While illustrative embodiments of the present invention have been disclosed herein, it is understood that various modifications and adaptations to the disclosed embodiments will be apparent to those of ordinary skill in the art and it is only intended that this invention be limited by the scope of the appended claims. Thus, while C-shaped wires have been disclosed for coupling the piezoelectric beam to the gyroscopic element, it is contemplated that other selectively compliant couplers could be utilized. For example, thin curved vanes formed out of sheet stock with their planes orthogonal to the plane of the piezoelectric beam and the gyroscopic element could be substituted for the wires.

We claim:

1. An angular rate sensor assembly comprising:
   a base member having a support surface and adapted for rotation about a spin axis transverse to said support surface;
   a generally planar gyroscopic element defining a plane and having a central opening;
   means for resiliently coupling said gyroscopic element to said base member support surface for rotation therewith and for pivotal movement relative to said base member about a single pivot axis orthogonal to said spin axis, said coupling means being effective for holding said gyroscopic element so that the plane of said gyroscopic element is substantially orthogonal to said spin axis;
   a planar piezoelectric beam defining a plane;
   first coupling means for coupling said piezoelectric beam to said base member support surface; and
   second coupling means for coupling said piezoelectric beam to said gyroscopic element;
   said first and second coupling means being together effective for holding said piezoelectric beam within said central opening of said gyroscopic element and substantially parallel to said gyroscopic element so that pivotal movement of said gyroscopic element relative to said base member about said pivot axis due to an angular velocity of said assembly about an axis orthogonal to said spin axis results in said piezoelectric beam bending about a bend axis parallel to said pivot axis.

2. The sensor assembly according to claim 1 wherein:
   said first coupling means rigidly couples a first end of said piezoelectric beam to said base member support surface; and
   said second coupling means couples an opposed end of said piezoelectric beam to said gyroscopic element in a selectively compliant manner so that relative motion between said gyroscopic element and said piezoelectric beam in a direction parallel to the plane of said piezoelectric beam is absorbed by said second coupling means and motion of said gyroscopic element in a direction perpendicular to the plane of said piezoelectric beam is transmitted to said piezoelectric beam by said second coupling means.

3. The sensor assembly according to claim 2 wherein said first coupling means comprises a boss secured to said base member support surface and extending toward said gyroscopic element, said boss being formed with a slot in a plane orthogonal to said spin axis, said slot having a dimension along said spin axis substantially equal to the thickness of said piezoelectric beam at said piezoelectric beam first end so that said piezoelectric beam first end may be retained within said slot.

4. The sensor assembly according to claim 3 wherein said second coupling means comprises a wire having a first end, a second end and a central section between said first and second ends, said wire being formed generally into a C-shape with said first and second ends of said wire being secured to said gyroscopic element along the periphery of said central opening and said central section of said wire being secured to said opposed end of said piezoelectric beam.

5. The sensor assembly according to claim 4 wherein said first and second ends of said second coupling means wire straddle said gyroscopic element.

6. The sensor assembly according to claim 5 wherein said gyroscopic element has first and second opposed major surfaces, said gyroscopic element being formed along said major surfaces with linear grooves extending from the periphery of said central opening orthogonally to both said spin and pivot axes, and said first and second ends of said second coupling means wire being each retained within a respective one of said grooves.

7. The sensor assembly according to claim 1 wherein:
   said first coupling means couples a first end of said piezoelectric beam to said base member support surface in a selectively compliant manner so that relative motion between said piezoelectric beam and said base member in a direction parallel to the plane of said piezoelectric beam is absorbed by said first coupling means and said piezoelectric beam is rigidly coupled to said base member to prevent such relative motion in a direction perpendicular to the plane of said piezoelectric beam;
   said second coupling means couples an opposed end of said piezoelectric beam to said gyroscopic element in a selectively compliant manner so that relative motion between said gyroscopic element and said piezoelectric beam in a direction parallel to the plane of said piezoelectric beam is absorbed by said second coupling means and motion of said gyroscopic element in a direction perpendicular to the plane of said piezoelectric beam is transmitted to said piezoelectric beam by said second coupling means; and
   said second coupling means further includes means for coupling a central portion of said piezoelectric beam between the first and opposed ends of said piezoelectric beam to said gyroscopic element in a selectively compliant manner so that relative motion between said gyroscopic element and said piezoelectric beam in a direction parallel to the plane of said piezoelectric beam is absorbed by said second coupling means and motion of said gyroscopic element in a direction perpendicular to the plane of said piezoelectric beam is transmitted to said piezoelectric beam by said second coupling means.

8. The sensor assembly according to claim 7 wherein said first coupling means comprises:
   a boss secured to said base member support surface and extending toward said gyroscopic element, said boss being formed with a slot in a plane orthogonal to said spin axis, said slot having a dimension along said spin axis greater than the thickness of said piezoelectric beam at said piezoelectric beam first end; and
   a plurality of wires extending across said slot parallel to said spin axis, the ends of said wires being secured to said boss and the central sections of said wires being secured to said first end of said piezoelectric beam.

9. The sensor assembly according to claim 8 wherein, said second coupling means comprises a wire having a first end, a second end and a central section between said first and second ends, said wire being formed generally into a C-shape with said first and second ends of said second coupling means wire being secured to said gyroscopic element along the periphery of said central opening and said central section of said second coupling means wire being secured to said opposed end of said piezoelectric beam.

10. The sensor assembly according to claim 9 wherein said first and second ends of said second coupling means wire straddle said gyroscopic element.

11. The sensor assembly according to claim 10 wherein said gyroscopic element has first and second opposed major surfaces, said gyroscopic element being formed along said major surfaces with linear grooves extending from the periphery of said central opening orthogonally to both said spin and pivot axes, and said first and second ends of said second coupling means wire being each retained within a respective one of said grooves.

12. The sensor assembly according to claim 9 wherein said second coupling means comprises first and second wires each having a first end, a second end and a middle section between the first and second ends, the first and second wires of said further coupling means each being formed generally into a C-shape with the first and second ends being secured to said gyroscopic element along the periphery of said central opening and the middle sections of said first and second wires of said second coupling means each being secured to a respective opposed side of said piezoelectric beam between said first and opposed ends, a line drawn between where said first and second wires of said further coupling means are secured to said piezoelectric beam being parallel to said bend axis.

13. The sensor assembly according to claim 12 wherein said first and second ends of said further coupling means first and second wires straddle said gyroscopic element.

14. The sensor assembly according to claim 13 wherein said gyroscopic element has first and second opposed major surfaces, said gyroscopic element being formed along said major surfaces with linear grooves extending from the periphery of said central opening parallel to said pivot axis, and said first and second ends of said further coupling means first and second wires being each retained within a respective one of said grooves.

15. The sensor assembly according to claim 1 wherein:
said first coupling means couples a central section of said piezoelectric beam to said base member support surface in a selectively compliant manner so that relative motion between said piezoelectric beam and said base member in a direction parallel to the plane of said piezoelectric beam is absorbed by said first coupling means and said piezoelectric beam is rigidly coupled to said base member to prevent such relative motion in a direction perpendicular to the plane of said piezoelectric beam; and
said second coupling means couples both opposed ends of said piezoelectric beam to said gyroscopic element in a selectively compliant manner so that relative motion between said gyroscopic element and said piezoelectric beam in a direction parallel to the plane of said piezoelectric beam is absorbed by said second coupling means and motion of said gyroscopic element in a direction perpendicular to the plane of said piezoelectric beam is transmitted to said piezoelectric beam by said second coupling means.

16. The sensor assembly according to claim 15 wherein said first coupling means comprises:
a pair of bosses secured to said base member support surface and extending toward said gyroscopic element, each of said pair of bosses being formed with a respective slot, said respective slots being coplanar in a plane orthogonal to said spin axis, said respective slots each having a dimension along said spin axis greater than the thickness of said piezoelectric beam, said pair of bosses being positioned in opposed relationship across said piezoelectric beam along a line parallel to said pivot axis with said respective slots facing each other; and
a plurality of wires extending across each of said respective slots parallel to said spin axis, the ends of each of said wires being secured to a respective boss and the central section of each of said wires intermediate said each wire ends being secured to said piezoelectric beam.

17. The sensor assembly according to claim 16 wherein said second coupling means comprises a pair of wires each having a first end, a second end and a central section between said first and second ends, said pair of wires being formed generally into respective C-shapes with said first and second ends of each of said pair of wires being secured to said gyroscopic element along the periphery of said central opening and said central section of each of said pair of wires being secured to a respective opposed end of said piezoelectric beam.

18. The sensor assembly according to claim 17 wherein said first and second ends of each of said second coupling means wires straddle said gyroscopic element.

19. The sensor assembly according to claim 18 wherein said gyroscopic element has first and second opposed major surfaces, said gyroscopic element being formed along said major surfaces with linear grooves extending from the periphery of said central opening orthogonally to both said spin and pivot axes, and said first and second ends of said second coupling means wires being each retained within a respective one of said grooves.

20. The sensor assembly according to claim 1 wherein said gyroscopic element is formed with at least one cavity open along the outer periphery of said gyroscopic element, and further including at least one weight disposed in said at least one cavity to increase the inertial mass of said gyroscopic element over the inertial mass of said gyroscopic element without said at least one cavity.

21. The sensor assembly according to claim 1 wherein said first and second coupling means are selectively compliant to isolate said piezoelectric beam from motion in the plane of said beam.

* * * * *